(12) United States Patent
O'Sullivan et al.

(10) Patent No.: US 11,531,211 B2
(45) Date of Patent: Dec. 20, 2022

(54) METHOD FOR STABILIZING A CAMERA FRAME OF A VIDEO SEQUENCE

(71) Applicant: FotoNation Limited, Galway (IE)

(72) Inventors: Brian O'Sullivan, Galway (IE); Piotr Stec, Galway (IE)

(73) Assignee: FotoNation Limited, Galway (IE)

( * ) Notice: Subject to any disclaimer, the term of this patent is extended or adjusted under 35 U.S.C. 154(b) by 59 days.

(21) Appl. No.: 17/233,546

(22) Filed: Apr. 19, 2021

(65) Prior Publication Data

US 2021/0302755 A1 Sep. 30, 2021

Related U.S. Application Data

(63) Continuation of application No. 16/575,748, filed on Sep. 19, 2019, now Pat. No. 10,983,363.

(51) Int. Cl.
*G02B 27/64* (2006.01)
*H04N 5/232* (2006.01)

(52) U.S. Cl.
CPC ....... *G02B 27/646* (2013.01); *H04N 5/23254* (2013.01); *H04N 5/23258* (2013.01); *H04N 5/23261* (2013.01); *G03B 2205/0007* (2013.01)

(58) Field of Classification Search
CPC .................................................. H04N 5/23267
See application file for complete search history.

(56) References Cited

U.S. PATENT DOCUMENTS

| 9,888,179 B1* | 2/2018 | Liang ........................ G06T 7/20 |
| 2004/0100560 A1 | 5/2004 | Stavely et al. |
| 2005/0122403 A1* | 6/2005 | Yoneda .............. H04N 5/23267 |
| | | 348/208.6 |

(Continued)

FOREIGN PATENT DOCUMENTS

| WO | 2014/005783 A1 | 1/2014 |
| WO | 2014/146983 A2 | 9/2014 |

(Continued)

OTHER PUBLICATIONS

Ken Shoemake, "Animating rotation with quaternion curves" ACM SIGGRAPH Computer Graphics 19(3), pp. 245-254 (JJul. 1985).

(Continued)

*Primary Examiner* — Noam Reisner
(74) *Attorney, Agent, or Firm* — Lee & Hayes, PC

(57) ABSTRACT

A method for stabilizing a video sequence comprises: obtaining an indication of camera movement from acquisition of a previous camera frame to acquisition of a current camera frame; determining an orientation for the camera at a time of acquiring the current camera frame; and determining a candidate orientation for a crop frame for the current camera frame by adjusting an orientation of a crop frame associated with the previous camera frame according to the determined orientation. A boundary of one of the camera frame or crop frame is traversed to determine if a specific point on the boundary of the crop frame exceeds a boundary of the camera frame. If so, a rotation of the specific point location which would bring the specific point location onto the boundary of the crop frame is determined and the candidate crop frame orientation updated accordingly before the crop frame is displayed.

19 Claims, 7 Drawing Sheets

(56) References Cited

U.S. PATENT DOCUMENTS

| | | | |
|---|---|---|---|
| 2006/0120615 A1* | 6/2006 | Wang | H04N 5/23248 |
| | | | 382/254 |
| 2010/0271485 A1 | 10/2010 | Kim et al. | |
| 2011/0149094 A1 | 6/2011 | Chen et al. | |
| 2011/0254972 A1 | 10/2011 | Yaguchi | |
| 2013/0208134 A1 | 8/2013 | Hamalainen | |
| 2013/0235221 A1* | 9/2013 | Zhou | H04N 5/23267 |
| | | | 348/580 |
| 2014/0267901 A1 | 9/2014 | Nowakowski et al. | |
| 2017/0332018 A1 | 11/2017 | Bell et al. | |
| 2018/0041707 A1 | 2/2018 | Beysserie et al. | |
| 2018/0220073 A1 | 8/2018 | Keal | |
| 2019/0028645 A1* | 1/2019 | Satoh | H04N 5/23254 |
| 2020/0137308 A1 | 4/2020 | Kulik et al. | |
| 2020/0137309 A1 | 4/2020 | Kulik et al. | |
| 2022/0038629 A1* | 2/2022 | Ozone | H04N 5/2628 |

FOREIGN PATENT DOCUMENTS

| | | |
|---|---|---|
| WO | 2017/140438 A1 | 8/2017 |
| WO | 2019/063850 A1 | 4/2019 |

OTHER PUBLICATIONS

European Paten Office: "Extended Search Report" for EP Patent Application No. 20187353.6 filed Jul. 23, 2020 titled "Method for Stabilizing a Camera Frame of a Video Sequence." EP Search Report dated Jan. 13, 2021; 9 pages.

* cited by examiner

METHOD FOR STABILIZING A CAMERA FRAME OF A VIDEO SEQUENCE

CROSS-REFERENCE TO RELATED APPLICATIONS

This application is a continuation of U.S. patent application Ser. No. 16/575,748 filed Sep. 19, 2019, which is incorporated by reference herein in its entirety.

FIELD

The present invention relates to a method for stabilizing a camera frame of a video sequence.

BACKGROUND

Electronic Image Stabilization (EIS) is a family of image enhancement techniques that utilize electronic processing to minimize image blurring and dampen the effects of camera shake. With advancements in camera imaging technology and the recent rise in popularity of action cameras for recording live sporting events, video blogging, and various on-the-fly events, there is a demand for high quality stabilized video from such cameras.

Popular methods to stabilize video require the use of additional hardware, such as a gyro-gimbal stabilizer or movable lens elements as used in optical image stabilization (OIS).

WO2017/140438 (Ref: FN-495-PCT) discloses stabilizing a sequence of images captured by an image capture device. The method comprises, using lens based sensors indicating image capture device movement during image acquisition to perform OIS during acquisition of each image of the sequence of images to provide a sequence of OIS corrected images. Movement of the device for each frame during which each OIS corrected image is captured is determined using inertial measurement sensors. At least an estimate of OIS control performed during acquisition of an image is obtained. The estimate is removed from the intra-frame movement determined for the frame during which the OIS corrected image was captured to provide a residual measurement of movement for the frame. EIS of each OIS corrected image based on the residual measurement is performed to provide a stabilized sequence of images.

Alternatively, post-processing techniques can stabilize video by feature matching between frames to track camera motion, smooth it, and then produce stabilized video. For the casual videographer, these additional hardware requirements and/or post-processing steps can be both time consuming and expensive.

It is an object of the present invention to provide stabilization in real-time of a video feed acquired with a camera susceptible to shake.

SUMMARY

According to the present invention, there is provided a method for stabilizing a camera frame of a video sequence according to claim 1.

Further aspects provide an image capture device and a computer program product comprising computer readable code which when executed on an image capture device is configured to perform the method according to the invention.

Embodiments ensure that the orientation of a crop frame relative to an image frame acquired by the camera, the camera frame, is controlled so that "black" borders do not intrude into the displayed crop frame.

Embodiments track camera motion using an on-board inertial measurement unit (IMU)—this low-cost unit is typically integrated within commercially available cameras. IMUs can comprise any combination of gyroscope, accelerometer or magnetometer and in embodiments of the present invention, the IMU is used principally to track the rotational motion of the camera and to provide an absolute orientation of the camera for camera frames in a recorded sequence.

A cropping of the recorded frames can follow a smoothed version of the camera's path. Once the cropped frame remains within the camera frame boundary, and moves smoothly and continuously, the displayed video is optimally stabilized. Embodiments detect when smoothed frame-to-frame movement could cause the cropped frame to leave the camera frame boundary and then adjust the path in a minimally disruptive manner.

Once stabilized according to the present method, no post-processing of the stabilized video frames is necessary. Nonetheless post-processing could be applied to any stored version of the video sequence stabilized according to the present method, for example, to remove or mitigate discontinuities evident in the stabilized video due to the adjustment of the cropped frame which would otherwise have breached the camera frame boundary.

Embodiments can operate in two phases: in a first phase, a frame wise correction quaternion which counter rotates the various lines of a crop frame by a minimum amount is determined according a relative orientation of the crop frame and camera frame so that the crop frame is back within the limits of the camera frame, with no black borders. In a potential second phase, in order to take into account fast camera motion on a rolling shutter exposure which can result in a squeezing of the camera frame relative to the cropped frame, correction quaternions are determined for each line of the rolling shutter camera frame, which effectively stretches the camera frame relative to the crop frame by the minimum amount so that the crop frame is back within the limits of the camera frame.

BRIEF DESCRIPTION OF THE DRAWINGS

An embodiment of the invention will now be described, by way of example, with reference to the accompanying drawings, in which.

DESCRIPTION OF THE EMBODIMENT

Figure 1:
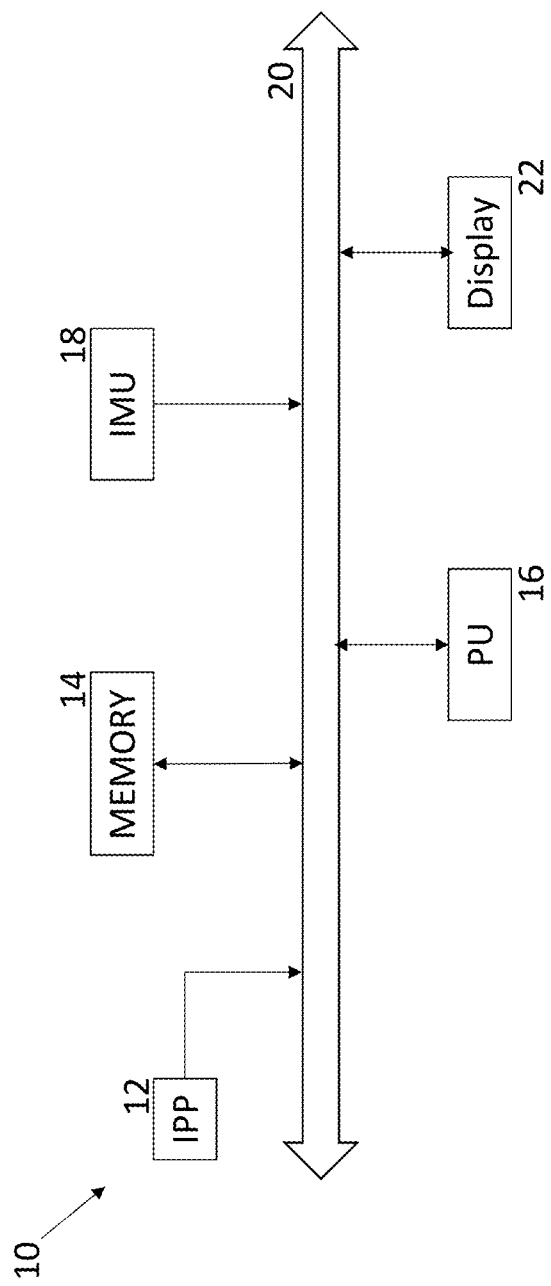
FIG. 1 shows a system for stabilizing a video sequence according to an embodiment of the present invention.

Referring to FIG. 1, image capture devices 10, referred to herein simply as cameras, typically comprise an image processing pipeline (IPP) 12 which obtains acquired image data from an image sensor (not shown), conducts basic processing of the raw image data, such as color balancing, and writes acquired images—camera frames—via a system bus 20 to system memory 14. Camera frames can be acquired by the IPP 12 at frame rates from 24 fps up to from 60 fps to even 240 fps. Note that some cameras employ a rolling shutter image sensor where the camera orientation may vary as successive rows of image information are captured and read from the image sensor. In these embodiments, meta information needs to be available indicating the different camera orientation from row to row, but once this is the case, embodiments of the invention can take into account this movement in producing a stabilized image.

Such cameras 10 can include downstream dedicated image processing units which can analyse acquired images and process such images either to extract information from the images or to correct the images. Such processing can include face detection and tracking, object recognition or distortion correction such as disclosed in PCT Application WO2014/005783 (Ref: FN-384-PCT). Other processing can determine frame-to-frame motion, for example, as disclosed in WO2014/146983 (Ref: FN-389-PCT) and PCT Application WO2017/140438 (Ref: FN-495-PCT).

In the present specification, such processing units, which can be dedicated hardware modules or a generic central processing unit (CPU), are indicated as processing unit (PU) 16 which is capable of running either low-level firmware/software or in the case of the CPU, application software, capable of obtaining image information from memory 14 and further processing the images.

As mentioned, it is known for cameras 10 to include inertial measurement units (IMU) 18 which can indicate a trajectory of camera movement during image acquisition and between acquisition of images, enable processing unit(s) 16 to use that information to correct an acquired image to take into account blur caused by involuntary or unwanted camera motion during image capture or to stabilize video sequences.

As mentioned above, the IMU 18 sensors can comprise: gyroscopic sensors providing measures of rotational velocity around each of the three spatial axes (X,Y,Z); and accelerometers which provide measures of translational acceleration during image sequence capture and the direction of the gravitational force. The IMU can further include a magnetometer indicating the absolute angular orientation of the camera relative to the earth's magnetic field.

In embodiments of the present invention, the processing unit 16 uses information from the IMU gyroscope to provide a sequence of stabilised crop frames from respective acquired camera frames.

The camera's rotational motion is the integral of the rotational frequency, measured by the gyroscope. In the present embodiment, this information is used to obtain the orientation of the camera at each instance in time a frame is captured, in quaternion form. For rolling shutter cameras, a camera frame is divided into a number of lines $L_i$, each line corresponding to one or more rows acquired from the image sensor.

The orientation of the camera is determined for each line and can be stored in association with the camera frame and represented subsequently in quaternion form as $\vec{Q}_{L_i}$. The rolling shutter adds an additional complexity for EIS as the effective shape of the camera's boundary changes from frame to frame. The degree of stretching and distortion of the camera frame depends on the angular frequency of the camera motion.

Figure 2:
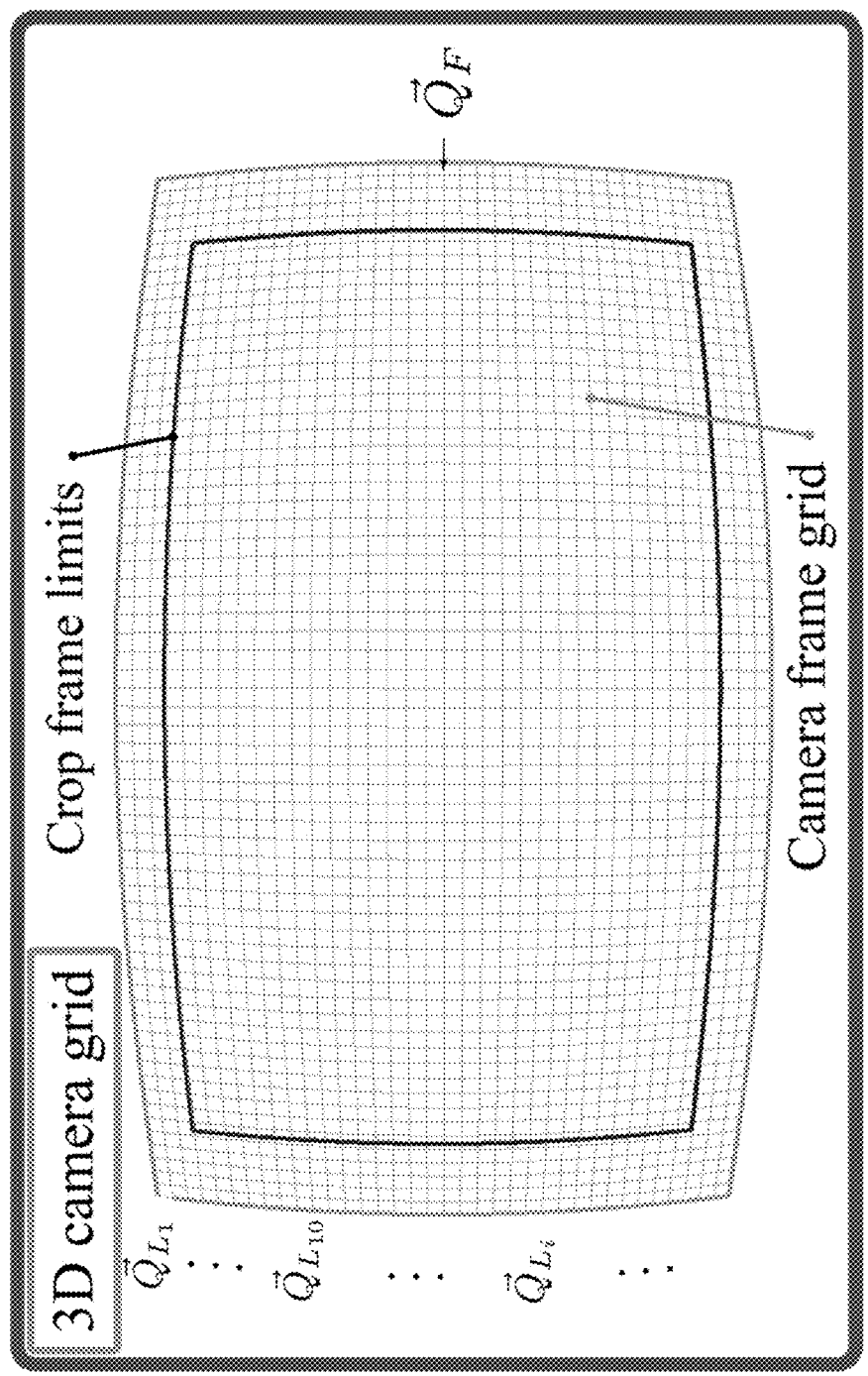
FIG. 2 shows a camera frame grid projected onto a unit sphere where: each horizontal row of the camera frame grid represents one line $L_i$ acquired from a rolling shutter image sensor; and $\vec{Q}_F$ represents an absolute orientation of the camera frame, chosen as an orientation for a mid-line of the camera frame.

Referring to FIG. 2, a camera frame does not itself have an absolute orientation, since each line of the rolling shutter corresponds with a potentially unique orientation of the camera. In the present embodiment, one quaternion, $\vec{Q}_F$ is chosen from the quaternions $\vec{Q}_{L_i}$ to represent the absolute orientation of the camera frame acquired from the rolling shutter. In the convention adopted within the present description, this quaternion $\vec{Q}_F$ is the camera orientation at the mid-point of the rolling shutter, i.e. the quaternion corresponding to the line at the mid-point of the frame, however, it will be appreciated that any line of the camera frame could be chosen as long as this is consistent.

Embodiments use a cropping of the acquired camera frames, with the crop frame following a smoothed path relative to camera frame to take into account shaky camera motion. In one embodiment, the shape of the cropped frame relative to the camera frame does not change during the recorded sequence. The absolute orientation of the cropped frame is labelled $\vec{Q}_C$ in quaternion terms. The first frame of the recording determines the camera's orientation, and the cropped frame's orientation. These are initialized as the identity, $\vec{Q}_F = \vec{Q}_C = (1,0,0,0)$, and all subsequent camera orientations are described relative to this point.

The smoothed path of the cropped frame is interpolated from the known path of the camera frame. There are a number of equivalent methods to obtain the smoothed motion, for example, spherical linear interpolation as illustrated in equations 1a and 1b below, or linear interpolation as illustrated in equation 1c:

Spherical linear interpolation:

$$\vec{Q}'_C = \vec{Q}_C \otimes (\vec{Q}_C^{-1} \otimes \vec{Q}_F)^{1-\lambda} \qquad \text{(Equation 1a)}$$

The parameter $\lambda$ is some value between 0 and 1, which determines the degree of smoothing. $\vec{Q}_F$ is the camera quaternion for the current frame derived from the IMU 18, $\vec{Q}_C$ is the crop quaternion from the previous frame and $\vec{Q}'_C$ is the candidate crop quaternion of the current frame. The symbol $\otimes$ indicates quaternion multiplication. Equivalently, $$\vec{Q}'_C = \frac{\sin((1-\lambda)\Omega)}{\sin(\Omega)} \vec{Q}_F + \frac{\sin(\lambda\Omega)}{\sin(\Omega)} \vec{Q}_C \qquad \text{(Equation 1b)}$$

where, $\cos(\Omega) = \vec{Q}_F \cdot \vec{Q}_C$.

Linear interpolation:

$$\vec{Q}'_C = \vec{Q}_C + \lambda(\vec{Q}_F - \vec{Q}_C) \qquad \text{(Equation 1c)}$$

These methods are detailed in Ken Shoemake, "Animating rotation with quaternion curves" ACM SIGGRAPH Computer Graphics 19(3), pages 245-254 July (1985). For small values of λ the stabilized path is very smooth, which comes at the expense of a large lag between the camera's path and the cropped frame's path.

Figure 3:
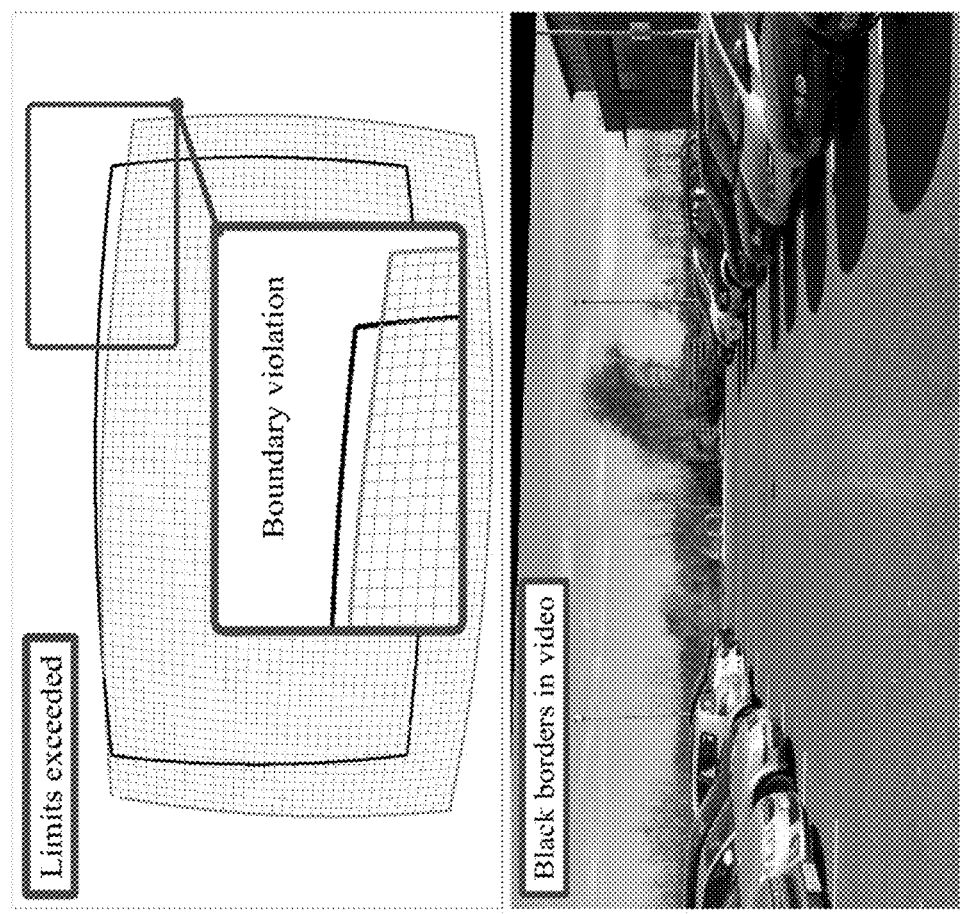
FIG. 3 illustrates a boundary violation, where the relative motion of a crop frame would exceed the limits of the camera frame, resulting in "black" borders in the displayed crop frame.

The boundary of the crop frame defines the limits of the relative motion of the camera and crop frames. In the event that the boundary of the crop frame were to move beyond the limits of the camera frame, so-called "black" borders would intrude on the stabilized video, as illustrated in FIG. 3. These borders are referred to as black in the present specification, because they would otherwise be displayed without any image information and so could appear as black—other displays might render such border areas with different colours or patterns.

Figure 4:
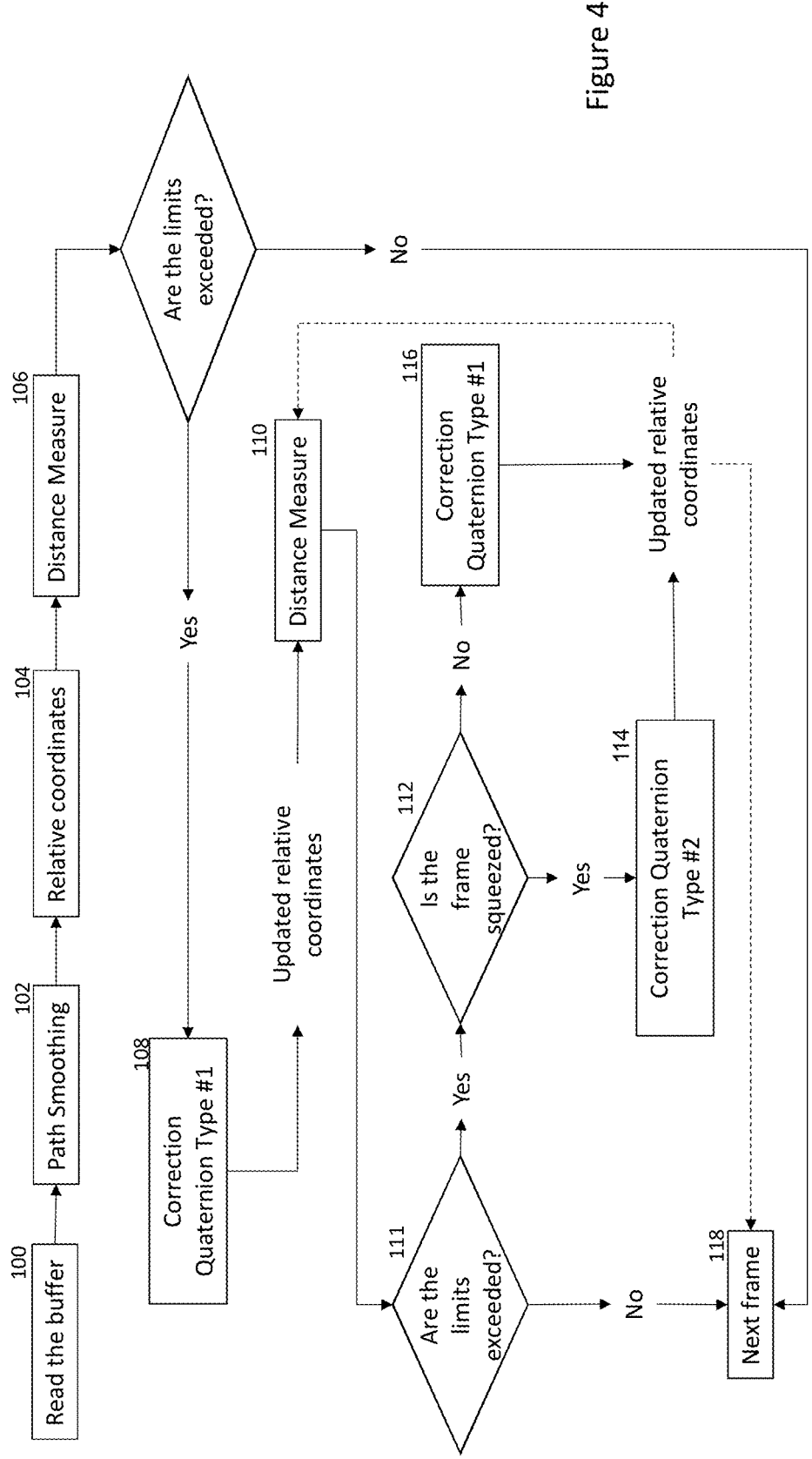
FIG. 4 is a flow diagram illustrating generally a method for stabilizing a camera frame of a video sequence according to an embodiment of the present invention.

Referring now to FIG. 4, embodiments of the present invention limit the potential rotation of a crop frame in response to camera movement to prohibit the appearance of black borders in a stabilized video sequence.

In step 100, a camera frame is acquired from an IPP 12. This can be stored temporarily in a cache within a processing unit 16 or it may be stored in main memory 14. A measure of camera movement during the acquisition of the camera frame may either be acquired by the processing unit 16 directly from an IMU 18 or this information may be acquired from meta-information associated with the stored camera frame in memory. This path is smoothed, step 102 and used then as illustrated in equations 1(a) . . . (c) above to determine the relative coordinates (in quaternion form $\vec{Q}'_C$) for a candidate crop frame orientation for the present camera frame, step 104, for example, as explained in relation to equations (1) above. As will be explained in more detail, a distance between a camera frame boundary and a boundary of the crop frame at a candidate orientation is calculated at grid points around a boundary of the camera (or the crop) frame to determine if a boundary violation would occur, step 106. In the event of a potential boundary violation, a correction quaternion $\vec{Q}_{cor}$ of a first type is calculated, step 108, to counter rotate the orientation $\vec{Q}'_C$ of the candidate crop frame by a minimum amount so that it is located back within the limits of the camera frame, so that no black borders appear in the stabilized video sequence, again this will be explained in more detail below.

As mentioned, embodiments can be implemented in rolling shutter cameras, where rapid camera motion can squeeze and distort the boundary of the camera frame to the extent that it is smaller than the cropped frame and so it is possible that even after rotating the crop frame according to the calculated distance back inside the camera frame, the camera frame boundary may still be violated by the rotated candidate crop frame orientation.

In order to determine if such camera motion could cause a black boundary, in the present embodiment, the distance measure of step 106 is reapplied in step 110 before determining in step 111 if the rotated candidate crop frame orientation based on the correction quaternion $\vec{Q}_{cor}$ would cause a boundary violation.

Figure 7:
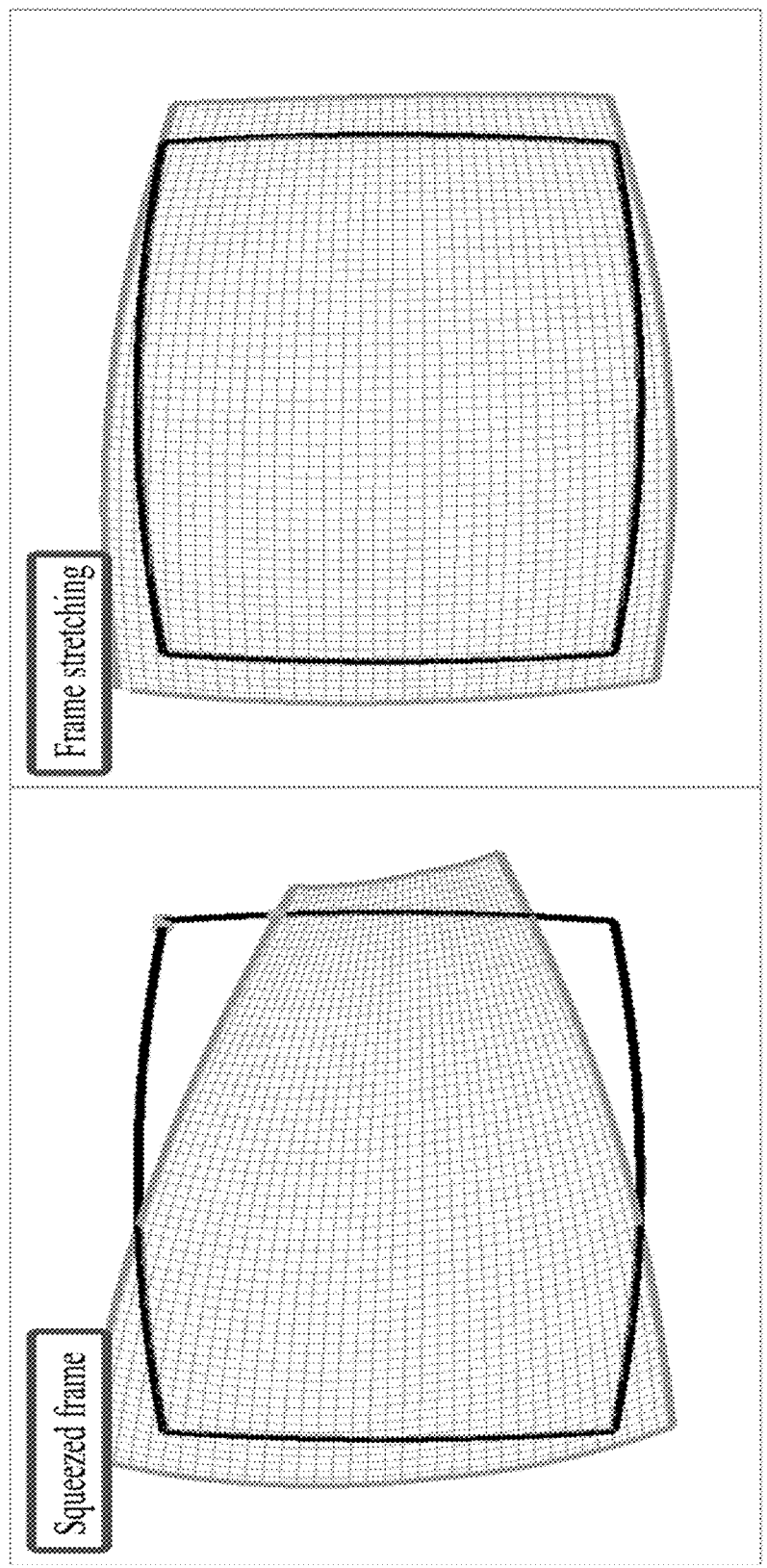
FIG. 7 shows how fast camera motion can effectively squeeze a camera frame boundary so that it is smaller than the limits of the crop frame and, to bring the crop frame back within the limits, a correction quaternion for each line of the rolling shutter needs to be found to stretch the camera frame by a minimum amount to avoid "black" borders intruding on the displayed crop frame.

If so, then in step 112, the processing unit tests if a camera frame has been squeezed as illustrated in FIG. 7 and as will be explained in more detail below.

Squeezing caused by rapid camera motion can be corrected by stretching a camera frame line-by-line, by the minimum amount, so that the borders of crop frame are back within the camera frame limits.

Thus, in this event, a correction quaternion of a second type is applied to the rotated candidate crop frame, step 114 to stretch the camera frame information. This involves calculation of a line-by-line correction $\vec{Q}_{cor_i}$ of the candidate crop frame orientation from step 108, again as will be explained in more detail below.

If the frame is not squeezed, then the boundary frame violation detected at step 111 may be as a result of the approximation of camera movement and/or the granularity of the camera grid at whose nodes the distance measure of step 106 is performed. Thus, in this case, using the distance measure calculated in step 110, a further correction quaternion of the first type used in step 108 is applied to the rotated candidate crop frame orientation to refine its orientation and minimize any boundary frame violation, step 116.

This process can be repeated by returning to perform the distance measurement of step 110 again or alternatively, the process could complete by proceeding to calculating the required correction quaternion for the next frame.

Note that once the correction quaternion, either frame wise from steps 104, 108 or 116; and/or line-by-line from step 114 is calculated and the final orientation of the lines of the crop frame relative to the camera frame has been determined, this crop frame orientation is then used to determine a mapping from pixel locations in a crop frame to be displayed into coordinates within the camera frame. Then, pixel locations within the camera frame surrounding those coordinates can be interpolated to provide a value for the pixel location within the crop frame, as explained in for example, PCT Application WO2019/063850 (Ref: FN-622-PCT). The interpolated crop frame information can be stored in memory 14 and/or displayed directly with the likelihood of having any black boundary pixels minimized to extreme unavoidable circumstances.

In relation to steps 106, 110, in embodiments of the present invention, the distance between the camera frame and a crop frame rotated according to camera movement is calculated using the unit sphere as follows:

The gyro data is integrated to obtain the quaternion $\vec{Q}_F$ describing the absolute camera orientation at the mid-point of the rolling shutter, which is stored locally in quaternion form. The absolute orientation of each line of the rolling shutter, $\vec{Q}_{L_i}$, as illustrated in FIG. 2, can also be stored locally and retrieved as required.

The relative orientation of the camera frame relative to the crop frame is labelled $\vec{Q}_f$ and is given by:

$$\vec{Q}_f = \vec{Q}_F^{-1} \otimes \vec{Q}'_C \qquad \text{(Equation 2a)}$$

The relative orientation of each line of the rolling shutter is described with respect to the crop frame and labelled $\vec{Q}_{1_i}$.

$$\vec{Q}_{l_i} = \vec{Q}_{L_i}^{-1} \otimes \vec{Q}'_C \qquad \text{(Equation 2b)}$$

Figure 5:
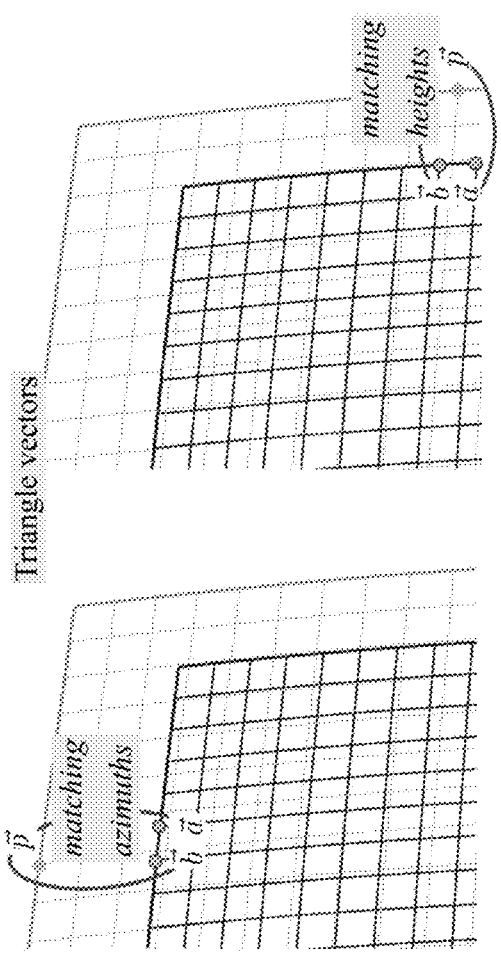
FIG. 5 illustrates of a distance measure employed in a method according to the embodiment of FIG. 4, where for the top and bottom edges, a node on the camera frame whose azimuthal coordinate is between the neighboring nodes on the crop frame is used, and where for the left and right edges, a node on the camera frame whose height is between the heights of the neighboring nodes on the crop frame is used.

FIG. 2 shows the camera frame grid, and the crop frame limits plotted on the unit sphere. FIG. 5 shows a close up of the crop and camera grids. Each node on the grid is a unit vector extending from the centre of the sphere. Both the crop and camera frames contain n×m segments. The limits of the relative motion is defined by the boundary of the crop frame.

1) Neighbouring nodes on the crop frame boundary are the unit vectors:

$$\vec{a} = (a_x, a_y, a_z)$$

$$\vec{b} = (b_x, b_y, b_z)$$

The corresponding node on the camera frame is the unit vector.

$$\vec{p} = (p_x, p_y, p_z)$$

2) The boundary of the crop frame is prepared by precalculating the normalized cross products $$\frac{\vec{a} \times \vec{b}}{|\vec{a} \times \vec{b}|}$$

between each pair of neighbouring nodes $\vec{a}$ and $\vec{b}$ on the boundary. Note that for a zoom lens, these normalized cross products would be pre-calculated and stored for all zoom values of the lens (changing focal lengths and field of view). These values can be stored locally in memory 14 or within the processing unit 16 and used to calculate the distance measure for each frame. The corresponding node on the camera frame boundary $\vec{p}$ lies in the interval between $\vec{a}$ and $\vec{b}$.

For the top and bottom edges the azimuthal coordinate of $\vec{p}$ is in the interval between the azimuth of $\vec{a}$ and $\vec{b}$. For the right and left frame edges, the height of the node $\vec{p}$ lies in the interval between the heights of the nodes $\vec{a}$ and $\vec{b}$. These are illustrated in FIG. 5.

3) The vectors, $\vec{a}$, $\vec{b}$ and $\vec{p}$ form a triangle. Their scalar triple product is the distance measure between the frames for that segment of the frame.

$$D = -\frac{(\vec{a} \times \vec{b}) \cdot \vec{p}}{|\vec{a} \times \vec{b}|} \quad \text{(Equation 3)}$$

4) The distance D=0 when the camera node is on the crop frame boundary. The limits are crossed when the scalar triple product changes sign (from positive to negative).
5) The scalar triple product is calculated for all triangles on the frame boundary, and the minimum distance, $D_{min}$, between the frames is stored.

When the minimum distance is less than zero, $D_{min} < 0$, the limits are exceeded and the relative orientation between the frames must be corrected.

Note that in variations of the above described embodiment, other methods than the described triple product for determining a point on one of the camera frame or crop frame boundaries where the crop frame maximally exceeds the camera frame can be employed. Nonetheless, it will be appreciated that the above method provides an efficient way of determining not only a boundary violation, but its magnitude.

The method to find a correction quaternion $\vec{Q}_{cor}$ required to bring the candidate crop frame at orientation $\vec{Q}'_C$ back within the boundary of the camera frame in steps 108 and 116 is as follows.

1) The correction quaternion is expressed in axis-angle form as:

$$\vec{Q}_{cor} = \left(\cos\left(\frac{\alpha}{2}\right), \sin\left(\frac{\alpha}{2}\right)n_x, \sin\left(\frac{\alpha}{2}\right)n_y, \sin\left(\frac{\alpha}{2}\right)n_z\right) \quad \text{(Equation 4)}$$

where, $\vec{n} = (n_x, n_y, n_z)$ is a correction axis and $\alpha$ is an angle through which the candidate crop frame orientation must be rotated to bring the crop frame within the boundary of the camera frame. One convenient choice for the correction axis is the conjugate of the camera frame quaternion, $\vec{Q}_f$, where the elements of the quaternion are expressed as follows:

$$\vec{Q}_f = (w,x,y,z) \quad \vec{Q}_f^{-1} = (w,-x,-y,-z)$$

Thus, the correction axis is:

$$\vec{n} = (n_x, n_y, n_z) = \frac{(-x, -y, -z)}{\sqrt{x^2 + y^2 + z^2}}$$

However, it will be appreciated that in other implementations, other axes could be chosen, so creating slight differences in the path through which the point $\vec{p}$ will be rotated to position the point on the boundary of the crop frame.

2) The node on the camera frame corresponding to the maximum boundary violation is rotated to a new position via:

$$\vec{p}' = \vec{Q}_{cor} \otimes \vec{p} \otimes \vec{Q}_{cor}^{-1}$$

The new position of the node is a distance $$D' = -(\vec{a} \times \vec{b}) \cdot \vec{p}' = 0$$

from the boundary of the camera frame.

3) The equation for D' results in a quadratic equation in, $$X = \cos\left(\frac{\alpha}{2}\right)^2,$$

$$A X^2 + B X + C = 0$$

which is solved in terms of cos $$\left(\frac{\alpha}{2}\right).$$

The correction cosine is given by $$\cos\left(\frac{\alpha}{2}\right) = \sqrt{\frac{-B + \sqrt{B^2 - 4AC}}{2A}} \quad \text{(Equation 5)}$$

We need only consider the positive root, as quoted above, and the abbreviations A, B, and C are explicitly given by:

$$A = \beta_2^2 + 4\beta_3^2 \quad B = 2\beta_1\beta_2 - 4\beta_3^2 \quad C = \beta_1^2$$

with $$\beta_1 = (\vec{a} \times \vec{b}) \cdot \vec{s}$$

$$\beta_2 = (\vec{a} \times \vec{b}) \cdot (\vec{p} - \vec{s})$$

$$\beta_3 = (\vec{a} \times \vec{b}) \cdot (\vec{n} \times \vec{p})$$

and the vector $\vec{s} = (s_x, s_y, s_z)$ is defined, $$s_x = 2n_x(n_y p_y + n_z p_z) + (n_x^2 - n_y^2 - n_z^2)p_x$$

$$s_y = 2n_y(n_x p_x + n_z p_z) - (n_x^2 - n_y^2 + n_z^2)p_y$$

$$s_z = 2n_z(n_x p_x + n_y p_y) - (n_x^2 + n_y^2 - n_z^2)p_z$$

4) The relative orientation of the crop frame $\vec{Q}'_C$, the camera frame $\vec{Q}_f$, and each rolling shutter line $\vec{Q}_{l_i}$, is updated according to the correction quaternion as:

$$\vec{Q}''_C = \vec{Q}'_C \otimes \vec{Q}_{cor} \quad \text{(Equation 6a)}$$

$$\vec{Q}'_f = \vec{Q}_f \otimes \vec{Q}_{cor} \quad \text{(Equation 6b)}$$

$$\vec{Q}'_{l_i} = \vec{Q}_{l_i} \otimes \vec{Q}_{cor} \quad \text{(Equation 6c)}$$

Figure 6:
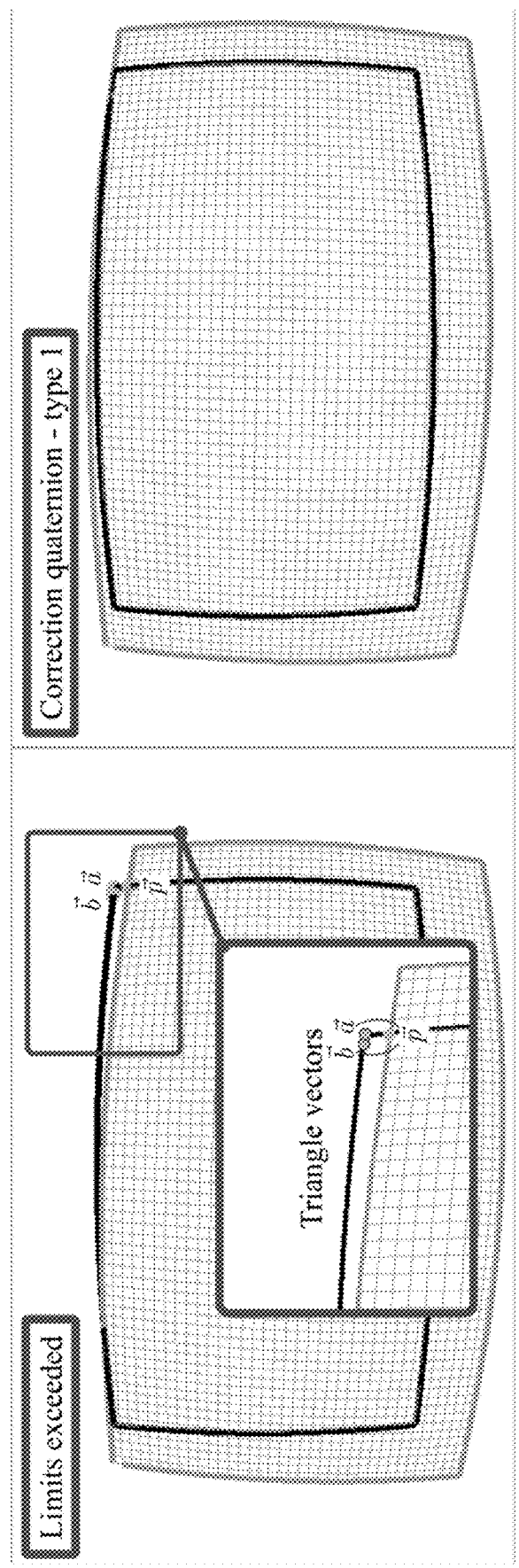
FIG. 6 shows that in the event of a potential boundary violation, the triangle vectors corresponding to the maximum boundary violation can be used to calculate a correction quaternion of a first type, counter rotating the crop frame by a minimum amount so that the crop frame is back within the limits of the camera frame.

So as illustrated in FIG. 6, the above correction quaternion $\vec{Q}_{cor}$ can correct the relative orientation of the candidate crop frame orientation and camera frame by the minimum amount so that the crop frame is back within the limits of the camera frame, as shown in FIG. 6.

Referring now to FIG. 7 which is an example of frame squeezing which occurs when the camera is subject to very fast motion. Here the boundary of the camera frame is squeezed to be smaller than the crop frame limits. In one embodiment, frame squeezing is detected when:

the arc lengths between the top and bottom corners of the camera frame are smaller than the corresponding arc lengths of the crop frame, or the arc lengths between opposite corners of the camera frame are smaller than the corresponding arc lengths of the crop frame.

A threshold distance is used for the crop frame arc lengths. In the event of frame squeezing, the method to find the correction cosine is adapted as follows:

1) The maximum boundary violation is calculated via the "distance measure", and the triangle vectors are identified and stored.

The correction axis corresponds to the quaternion of the rolling shutter line $\vec{Q}_{l_i}$ where the maximum boundary violation was detected at step 110, and the subscript i identifies the rolling shutter line. The relative orientation of each rolling shutter line is in vector form, $$\vec{Q}_{l_i} = (w_i, x_i, y_i, z_i) \; \vec{Q}_{l_i}^{-1} = (w_i, -x_i, -y_i, -z_i)$$

The correction axis for each rolling shutter line is, $$\vec{n}_i = (n_{x_i}, n_{y_i}, n_{z_i}) = \frac{(-x_i, -y_i, z_i)}{\sqrt{x_i^2 + y_i^2 + z_i^2}}$$

2) The correction quaternion for each line i of the rolling shutter, is obtained by first casting the quaternions in axis-angle form.

$$\vec{Q}_{cor_i} = \left(\cos\left(\frac{\alpha_i}{2}\right), \sin\left(\frac{\alpha_i}{2}\right)n_{x_i}, \sin\left(\frac{\alpha_i}{2}\right)n_{y_i}, \sin\left(\frac{\alpha_i}{2}\right)n_{z_i}\right) \quad \text{(Equation 7)}$$

3) Let i=v be the index of the rolling shutter line where the maximum boundary violation occurred. The correction cosine cos $$\left(\frac{\alpha_v}{2}\right)$$

is obtained as described for steps 108, 116 above, using the triangle vectors, $\vec{a}$, $\vec{b}$ and $\vec{p}$, of the maximum boundary violation. The correction cosine for each line of the rolling shutter is given by the formulae $$\cos\left(\frac{\alpha_i}{2}\right) = 1 - \left(\frac{1 - \cos\left(\frac{\alpha_v}{2}\right)}{1 - w_v}\right)(1 - w_i) \quad \text{(Equation 8)}$$

From equations 7 and 8 we obtain the correction quaternions for each line of the rolling shutter. These stretch the frame by the minimum amount so that the crop frame is back within the limits of the camera frame.

4) The relative orientation of the crop frame is updated according to the correction quaternion of the middle line of the rolling shutter, $\vec{Q}_{cor_m}$, where i=m.

The relative orientation of the crop frame $\vec{Q}'_C$, the camera frame $\vec{Q}_f$, and each rolling shutter line $\vec{Q}_{l_i}$, is updated according to the correction quaternion as follows:

$$\vec{Q}''_C = \vec{Q}'_C \otimes \vec{Q}_{cor_m} \quad \text{(Equation 9a)}$$

$$\vec{Q}'_f = \vec{Q}_f \otimes \vec{Q}_{cor_m} \quad \text{(Equation 9b)}$$

$$\vec{Q}'_{l_i} = \vec{Q}_{l_i} \otimes \vec{Q}_{cor_i} \quad \text{(Equation 9c)}$$

Using these correction quaternions from step 114, the camera frame can be stretched by the minimum amount necessary to avoid the crop frame exceeding the boundary of the camera frame, as illustrated in FIG. 7.

The above described method is a stable and fast method to obtain the correction quaternion(s), that adjust the relative orientation of the camera and crop frames so that no black borders intrude in the stabilized video. This method can be suitable for all types of rolling shutter cameras. The method can correct the relative orientation of the camera and crop frames in all conditions of camera motion and is applicable to all lens models.

The invention claimed is:

1. A method for stabilizing a camera frame of a video sequence comprising:
   determining a candidate orientation for a crop frame for a current camera frame;
   determining that a first point on a boundary of the crop frame exceeds a boundary of the camera frame;
   determining, based on the first point on the boundary of the crop frame exceeding the boundary of the camera frame, a rotation of said first point to bring said first point within the boundary of said camera frame;
   updating said candidate crop frame orientation according to said rotation;
   mapping image information from said camera frame to said crop frame in accordance with said updated candidate crop frame orientation; and
   displaying said crop frame.

2. The method according to claim 1, further comprising:
   obtaining an indication of movement of a camera from acquisition of a previous camera frame to acquisition of current camera frame; and
   determining an absolute orientation for said camera at a time of acquiring said current camera frame,
   wherein determining the candidate orientation for the crop frame comprises adjusting an orientation of a crop frame associated with said previous camera frame according to said determined absolute orientation.

3. The method according to claim 2, wherein said camera frame is acquired from a rolling shutter image sensor, said camera frame being divided into a plurality of lines, each acquired at successive acquisition times, each line having a respective absolute orientation associated therewith, each line of said crop frame having a corresponding candidate orientation and wherein said absolute orientation for said camera comprises an orientation for one of said lines.

4. The method according to claim 3, further comprising, prior to said mapping:
determining a second point on the boundary of the crop frame exceeds a boundary of said camera frame;
determining, based on the second point exceeding said boundary, that said camera frame has been effectively distorted relative to the crop frame associated with the camera frame so that the camera frame is smaller than said crop frame; and
responsive to determining such distortion, stretching the camera frame line-by-line so that the borders of the crop frame at an updated candidate crop frame orientation are back within the camera frame boundary.

5. The method according to claim 4, wherein said stretching comprises:
determining for each line of said camera frame, a rotation as a function of an angle required to bring said second point location within said boundary of said crop frame at said updated candidate crop frame orientation; and
further updating said rotated candidate crop frame orientation according to a determined rotation for the camera frame.

6. The method according to claim 4, wherein said determining that the camera frame has been effectively distorted comprises determining either:
at least one arc length between a top and a corresponding bottom corner of the camera frame is smaller than a corresponding arc length of the crop frame, or
at least one arc length between opposite corners of the camera frame is smaller than a corresponding arc length of the crop frame.

7. The method according to claim 1, wherein determining that the first point on a boundary of the crop frame exceeds a boundary of the camera frame comprises:
traversing the boundary of one of the camera frame or crop frame for a set of points along said boundary;
determining a pair of points on the boundary of said crop frame at said candidate orientation spanning an interval in which the first point on the camera frame boundary lies; and
determining a distance between the first point and said pair of points.

8. A computer-readable storage medium having computer-executable instructions stored thereupon which, when executed by a computer, cause the computer to:
determine a candidate orientation for a crop frame for a current camera frame;
determine that a first point on a boundary of the crop frame exceeds a boundary of the camera frame;
determine, based on the first point on the boundary of the crop frame exceeding the boundary of the camera frame, a rotation of said first point to bring said first point within the boundary of said camera frame;
update said candidate crop frame orientation according to said rotation;
map image information from said camera frame to said crop frame in accordance with said updated candidate crop frame orientation; and
display said crop frame.

9. The computer-readable storage medium of claim 8, wherein the instructions further cause the computer to:
obtain an indication of movement of a camera from acquisition of a previous camera frame to acquisition of current camera frame; and
determine an absolute orientation for said camera at a time of acquiring said current camera frame,
wherein determining the candidate orientation for the crop frame comprises adjusting an orientation of a crop frame associated with said previous camera frame according to said determined absolute orientation.

10. The computer-readable storage medium of claim 9, wherein said camera frame is acquired from a rolling shutter image sensor, said camera frame being divided into a plurality of lines, each acquired at successive acquisition times, each line having a respective absolute orientation associated therewith, each line of said crop frame having a corresponding candidate orientation and wherein said absolute orientation for said camera comprises an orientation for one of said lines.

11. The computer-readable storage medium of claim 10, wherein prior to said mapping the instructions further cause the computer to:
determine a second point on the boundary of the crop frame exceeds a boundary of said camera frame;
determine, based on the second point exceeding said boundary, that said camera frame has been effectively distorted relative to the crop frame associated with the camera frame so that the camera frame is smaller than said crop frame; and
responsive to determining such distortion, stretch the camera frame line-by-line so that the borders of the crop frame at an updated candidate crop frame orientation are back within the camera frame boundary.

12. The computer-readable storage medium of claim 11, wherein the instructions further cause the computer to determine either:
at least one arc length between a top and a corresponding bottom corner of the camera frame is smaller than a corresponding arc length of the crop frame, or
at least one arc length between opposite corners of the camera frame is smaller than a corresponding arc length of the crop frame.

13. The computer-readable storage medium of claim 9, wherein the instructions that cause the computer to determine that the first point on a boundary of the crop frame exceeds a boundary of the camera frame further comprise instructions to cause the computer to:
traversing the boundary of one of the camera frame or crop frame for a set of points along said boundary;
determining a pair of points on the boundary of said crop frame at said candidate orientation spanning an interval in which the first point on the camera frame boundary lies; and
determining a distance between the first point and said pair of points.

14. An image capturing device comprising:
an image processing pipeline;
a memory;
one or more processors; and
one or more computer readable storage media communicatively coupled to the one or more processors and storing instructions that are executable by the one or more processors to:
determine a candidate orientation for a crop frame for a current image capture device frame;

determine that a first point on a boundary of the crop frame exceeds a boundary of the image capture device frame;

determine, based on the first point on the boundary of the crop frame exceeding the boundary of the image capture device frame, a rotation of said first point to bring said first point within the boundary of said image capture device frame;

update said candidate crop frame orientation according to said rotation;

map image information from said image capture device frame to said crop frame in accordance with said updated candidate crop frame orientation; and display said crop frame.

15. The image capturing device of claim 14, further comprising:

an inertial measuring unit, wherein the instructions further cause the computer to:

obtain an indication of movement of the image capture device from acquisition of a previous image capture device frame to acquisition of current image capture device frame; and determine an absolute orientation for said image capture device at a time of acquiring said current image capture device frame, and wherein determining the candidate orientation for the crop frame comprises adjusting an orientation of a crop frame associated with said previous image capture device frame according to said determined absolute orientation.

16. The image capturing device of claim 15, wherein said image capture device frame is acquired from a rolling shutter image sensor, said image capture device frame being divided into a plurality of lines, each acquired at successive acquisition times, each line having a respective absolute orientation associated therewith, each line of said crop frame having a corresponding candidate orientation and wherein said absolute orientation for said image capture device comprises an orientation for one of said lines.

17. The image capturing device of claim 15, wherein prior to said mapping the instructions further cause the computer to:

determine a second point on the boundary of the crop frame exceeds a boundary of said image capture device frame;

determine, based on the second point exceeding said boundary, that said image capture device frame has been effectively distorted relative to the crop frame associated with the image capture device frame so that the image capture device frame is smaller than said crop frame; and responsive to determining such distortion, stretch the image capture device frame line-by-line so that the borders of the crop frame at an updated candidate crop frame orientation are back within the image capture device frame boundary.

18. The image capturing device of claim 15, wherein the instructions further cause the computer to determine either:

at least one arc length between a top and a corresponding bottom corner of the image capture device frame is smaller than a corresponding arc length of the crop frame, or at least one arc length between opposite corners of the image capture device frame is smaller than a corresponding arc length of the crop frame.

19. The image capturing device of claim 15, wherein the instructions that cause the computer to determine that the first point on a boundary of the crop frame exceeds a boundary of the image capture device frame further comprise instructions to cause the computer to:

traverse the boundary of one of the image capture device frame or crop frame for a set of points along said boundary;

determine a pair of points on the boundary of said crop frame at said candidate orientation spanning an interval in which the first point on the image capture device frame boundary lies; and determine a distance between the first point and said pair of points.

* * * * *